United States Patent Office 3,219,713
Patented Nov. 23, 1965

3,219,713
HYDROCHLORINATION OF PERCHLOROLEFINS
Harry B. Copelin, Niagara Falls, N.Y., assignor to E. I. du Pont de Nemours and Company, Wilmington, Del., a corporation of Delaware
No Drawing. Filed June 4, 1962, Ser. No. 199,598
3 Claims. (Cl. 260—658)

This invention relates to a method of hydrochlorinating perchlorolefins. It relates particularly to a process for the production of pentachlorethane by the hydrochlorination of perchlorethylene.

Perchlorethylene and perchlorolefins in general do not add hydrogen chloride to the carbon-carbon double bond as do the simple hydrogen-containing olefins and partially chlorinated olefins. The unsaturated bond in these compounds appears to be relatively inert chemically and addition reactions with hydrogen chloride have not been encountered in the chemical literature.

The hydrochlorination of perchlorethylene to pentachlorethane has been found to be an essential step in a process for the conversion of perchlorethylene to trichlorethylene as disclosed in the co-pending application by Harry O. Burrus and Ronald F. Mason, Serial No. 199,604, filed June 4, 1962. This process involves a combination of the two novel reactions shown below:

$$C_2Cl_4 + HCl = C_2HCl_5 \quad (1)$$

$$C_2HCl_5 + RH = C_2HCl_3 + RCl + HCl \quad (2)$$

The expression, RH, in Equation 2 stands for a chlorine acceptor consisting of a hydrocarbon or partially chlorinated hydrocarbon which contains at least one hydrogen atom that can be replaced by chlorine. Since perchlorethylene and trichlorethylene are both important commercial solvents, processes for the interconversion of these two are of importance to the manufacturer who wishes to meet trade requirements for each. To date, a practical process for converting perchlorethylene to trichlorethylene has not been available.

The object of this invention is to provide a process by which a perchlorolefin or fully chlorinated olefin containing one or more unsaturated or ethylenic linkages between carbon atoms can be hydrochlorinated to produce a fully saturated chlorohydrocarbon containing one hydrogen atom per mole of hydrogen chloride added. A further objective is to provide a process for hydrochlorinating perchlorethylene to pentachlorethane.

It has now been discovered that these objectives can be attained by reacting the perchlorolefin with hydrogen chloride at a pressure of at least 500 p.s.i.g. (pounds per square inch gauge) and temperatures of at least 100° C. in the presence of metal or metalloid halides of the type known as Friedel-Craft catalysts. It has also been found that the best results are obtained when aluminum chloride is employed as the catalyst, preferably in amount equivalent to 10 to 30 mole percent based on the perchlorolefin charged. Other catalysts which may be employed include stannic chloride, ferric chloride, boron trifluoride, titanium tetrachloride and antimony pentachloride. Typical perchlorolefins include perchlorethylene, perchloropropene, perchlorobutene and hexachlorobutadiene.

By the process of this invention, substantially quantitative yields of pentachlorethane may be obtained by the reaction of perchlorethylene with hydrogen chloride at pressures of approximately 1000 to 1500 p.s.i.g. at temperatures in the range about 100° C. to about 200° C., preferably 125° C. to 135° C. in the presence of approximately 20 mole percent aluminum chloride based on the perchlorethylene charged. At higher temperatures, yields decrease and increasing amounts of high-boiling by-products are obtained. No appreciable amount of pentachlorethane is obtained in the absence of catalyst and practical yields cannot be secured in reasonable reaction periods at pressures below 500 p.s.i.g. Perchlorethylene does not add hydrogen chloride in the absence of the catalysts of this invention even on heating at pressures of 1600 p.s.i.g. On the contrary, as is well known, pentachlorethane is readily converted to perchlorethylene on heating.

The following example is introduced to illustrate the invention in greater detail but is not to be construed as limiting it.

*Example*

A series of experiments was carried out in which one mole proportion of perchlorethylene was heated with hydrogen chloride under varying conditions of temperature, pressure and catalysis. The results obtained in these experiments together with the conditions prevailing in each are summarized in the following table.

| Exp. No. | Catalyst | | Temp., ° C. | Max. Pressure, p.s.i.g. | Conversion of $C_2Cl_4$ to $C_2HCl_5$ percent |
| --- | --- | --- | --- | --- | --- |
| | Name | Mole percent | | | |
| 1 | $AlCl_3$ | 18 | 130 | 1,000 | 92 |
| 2 | $AlCl_3$ | 20 | 160 | 1,600 | 83 |
| 3 | $AlCl_3$ | 19 | 25 | 475 | 0.5 |
| 4 | $FeCl_3$ | 18 | 150 | 1,400 | 17 |
| 5 | $FeCl_3$ | 17 | 150 | 1,500 | 18 |
| 6 | No Catalyst | | 150 | 1,600 | 0 |

The reaction period for the tests summarized above was 2 hours except for Experiment No. 3 which was cut short after one hour since little or no reaction was indicated by the pressure gauge which served as an index for hydrogen chloride consumption.

The embodiments of the invention in which an exclusive property or privilege is claimed are defined as follows:

1. The process of converting perchlorethylene to pentachlorethane by heating with dydrogen chloride at a pressure of at least 500 p.s.i.g. and at a temperature the range of about 100° C. to about 200° C. in the presence of a Friedel-Craft catalyst selected from the group consisting of metal and metalloid halides.

2. The process of converting perchlorethylene to pentachlorethane by heating with hydrfogen chloride at a pressure of at least 500 p.s.i.g. and at a temperature in the range of about 100° C. to about 200° C. in the presence of a Friedel-Craft catalyst selected from the group consisting of metal and metalloid halides, the amount of said catalyst being in the range of 10 to 30 mole percent based on the perchlorethylene.

3. The process of converting perchlorethylene to pentachlorethane by heating with hydrogen chloride at a pressure of at least 500 p.s.i.g. and at a temperature in the range of about 100° C. to about 200° C. in the presence of 10 to 30 mole percent of aluminum chloride based on the perchlorethylene.

References Cited by the Examiner

UNITED STATES PATENTS

| 1,990,968 | 2/1935 | Wilbaut et al. | 260—658 |
| 2,058,465 | 10/1936 | Kharasch | 260—658 |
| 2,209,000 | 7/1940 | Nutting et al. | 260—663 |
| 3,065,280 | 11/1962 | Vogt | 260—663 |

OTHER REFERENCES

Houben-Weyl: Methoden der Organischen Chemie, vierte auflage, Band 5/3, pp. 812-822 (1962).

LEON ZITVER, *Primary Examiner.*